United States Patent

Kurokawa et al.

[15] 3,688,023

[45] Aug. 29, 1972

[54] COLOR TELEVISION CAMERA

[72] Inventors: Hiromichi Kurokawa; Yasuharu Kubota, both of Kanagawa, Japan

[73] Assignee: Sony Corporation, Tokyo, Japan

[22] Filed: April 26, 1971

[21] Appl. No.: 137,334

[30] Foreign Application Priority Data

April 29, 1970 Japan ......................45/36661

[52] U.S. Cl. ..............................................178/5.4 ST
[51] Int. Cl. ..............................................H04n 9/06
[58] Field of Search........................178/5.4 R, 5.4 ST

[56] References Cited

UNITED STATES PATENTS 2,843,659 7/1958 James....................178/5.4 ST

*Primary Examiner*—Robert L. Richardson
*Attorney*—Lewis H. Eslinger, Alvin Sinderbrand and Curtis, Morris & Safford

[57] ABSTRACT

A color television camera comprises an image pickup tube having a photoconductive layer for the photoelectric conversion of images projected thereon into an electrical output, a color filter for forming a color separated image of an object to be televised on the photoconductive layer, and an electrode arrangement through which an index image can be electrically produced on the photoconductive layer to provide in the tube output an index signal as well as a color video signal corresponding to the color separated image, such electrode arrangement including a first continuous transparent conductive layer and a second transparent conductive layer in the form of spaced stripes on the first transparent conductive layer and electrically insulated from the latter, with the photoconductive layer contacting the electrode arrangement at the stripes of the second transparent conductive layer and at the areas of the first transparent conductive layer between such stripes.

9 Claims, 16 Drawing Figures

INVENTOR
HIROMICHI KUROKAWA
YASUHARU KUBOTA
BY
Lewis H. Eslinger

INVENTOR
HIROMICHI KUROKAWA
BY YASUHARU KUBOTA
Lewis H. Eslinger

INVENTOR.
HIROMICHI KUROKAWA
BY YASUHARU KUBOTA
Lewis H. Eslinger

INVENTOR.
HIROMICHI KUROKAWA
BY YASUHARU KUBOTA
Louis H. Epling

COLOR TELEVISION CAMERA

The present invention relates generally to color television cameras, and more particularly is directed to improvements in a color television camera of the type employing an image pickup tube which generates a composite signal composed of an index signal and a color video signal, for example, as disclosed in copending U.S. Pat. application Ser. No. 72,593, filed Sept. 16, 1970, by Yasuharu Kubota, one of the present inventors, and having a common assignee herewith.

In the identified application, a color television camera is disclosed to include a single image pickup tube having a photoconductive surface which is scanned for the photoelectric conversion of images projected thereon into an electrical output, a color filter for forming a color separated image of an object to be televised on the photoconductive surface, and an electrode arrangement by which an index image is electrically produced on the photoconductive surface to provide, in the tube output, an index signal as well as a color video signal corresponding to the color separated image. Although the index signal, as thus produced, can be conveniently employed for separating individual color component signals from the color video signal, certain problems do exist in respect to the electrode arrangements specifically disclosed in the identified prior application. In the case where the electrode arrangement is disclosed to include two interleaved striped electrodes insulated from each other, signals are not obtained at the tube output when scanning those portions of the photoconductive surface located between the striped electrodes. Although an additional electrode is disclosed as being effective to avoid such interruption of the signal output, this introduces complexity and increased costs in the manufacture of the image pickup tube.

Accordingly, it is an object of the invention to provide a color television camera of the described type with an electrode arrangement that overcomes the above problems.

More specifically, it is an object of the invention to provide a simple and easily manufactured electrode arrangement for producing the index image on the photoconductive surface or layer of the image pickup tube.

In accordance with an aspect of this invention, in a color television camera of the described type, the electrode arrangement includes a first continuous transparent conductive layer and a second transparent conductive layer in the form of spaced stripes on the first layer and electrically insulated from the latter, with the photoconductive layer contacting the electrode arrangement at the stripes of the second transparent conductive layer and at the areas of the first transparent conductive layer between such stripes.

The above, and other objects, features and advantages of the invention, will be apparent in the following detailed description of an illustrative embodiment which is to be read in connection with the accompanying drawings, wherein.

Figure 1:
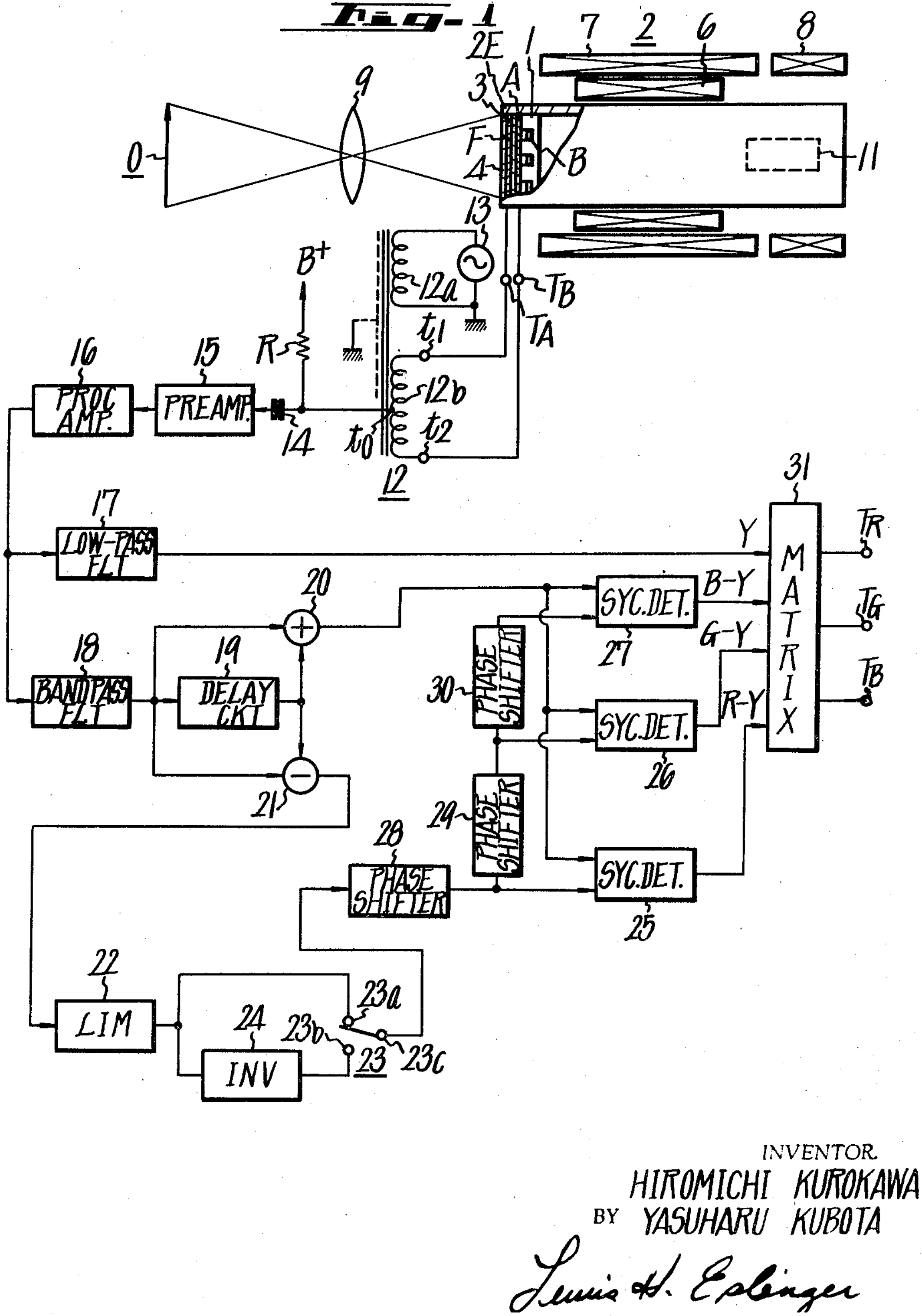
FIG. 1 is a schematic diagram showing one example of a color television camera according to this invention.
Figure 2:
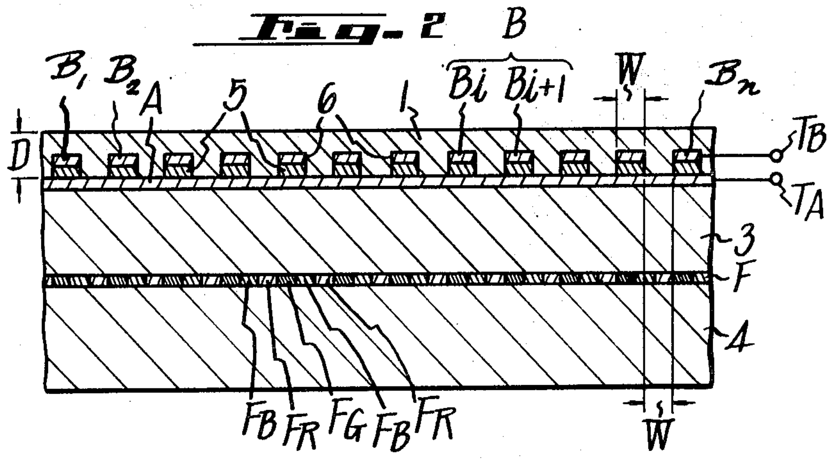
FIG. 2 is an enlarged cross-sectional view of the principal portion of an image pickup tube employed in the camera of FIG. 1.
Figure 3:
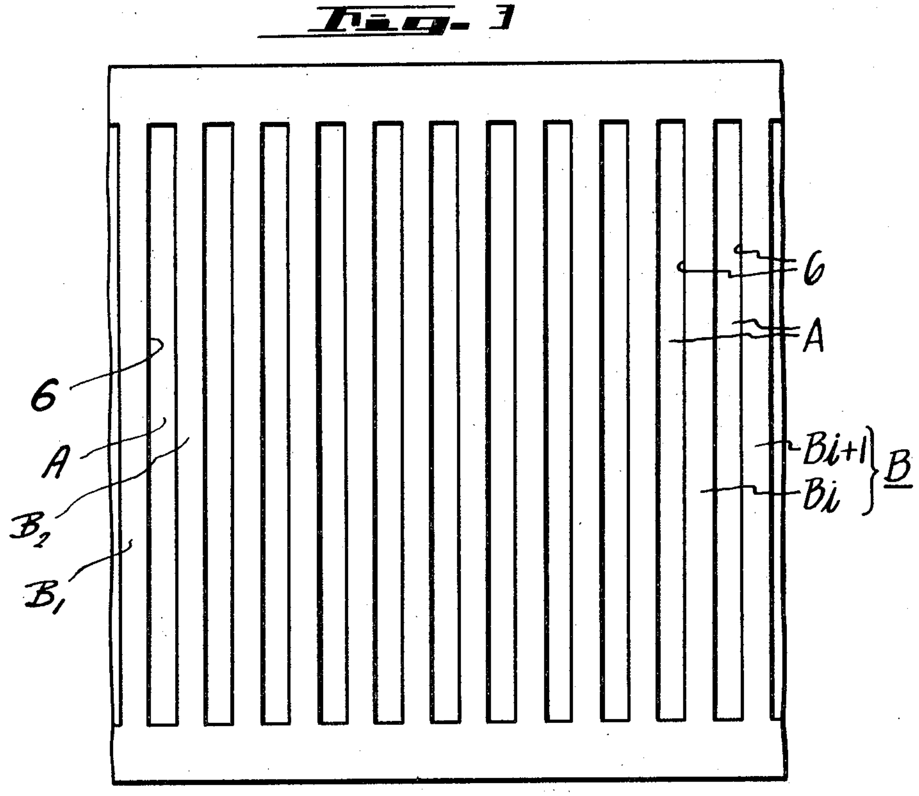
FIG. 3 is an enlarged elevational view illustrating the principal portion of the image pickup tube as viewed from the interior of the latter with its photoconductive layer removed.

Referring to the drawings in detail, and initially to FIGS. 1, 2 and 3, it will be seen that a color television camera according to this invention comprises two sets of electrodes A and B disposed adjacent the photoconductive layer 1 of a pickup tube 2. The photoconductive layer 1 is formed, for example, of materials such as antimony trisulfide, lead oxide, and the like, and the electrodes A and B are transparent conductive layers formed, for example, of tin oxide including antimony. The electrode A is a continuous transparent conductive layer formed on a glass plate 3, which is connected to a terminal $T_A$. On the electrode A there are formed transparent, spaced apart striped insulating layers 5, for example, of silicon dioxide, and, on such striped insulating layers, transparent electrode stripes $B_1, B_2, \cdots B_i \cdots B_n$ which together constitute the striped electrode B connected to a terminal $T_B$. In the illustrated embodiment, the several striped insulating layers 5 and the electrode stripes $B_1, B_2, \cdots B_i \cdots B_n$ are connected to each other at both of their ends, as particularly shown on FIG. 3. With the arrangement described, elongated open or slot-like areas or gaps 6 are defined between adjacent striped insulating layers 5 and the respective stripes of electrode B, and such slot-like areas or gaps 6 are made to extend perpendicular to the horizontal scanning direction of an electron beam in tube 2. The photoconductive layer 1 is shown to make direct contact with the electrode A in gaps 6 and with the striped electrode B in the order $A, B_1, A, B_2, \cdots A, B_i, \cdots A, B_n$ in the horizontal scanning direction of the electron beam.

In a preferred embodiment of the invention, the width of each of the stripes of electrode B and the width of each slot-like area or gap 6 is about 35 microns, the thickness D of the photoconductive layer 1 is about 1.0 micron, and the thicknesses of the electrodes A and B and of the insulating layer 5 are about 0.2 microns and from 0.4 to 0.5 microns, respectively.

The electrodes A and B and photoconductive layer 1 are shown to be at one side of a glass plate 3. At the other side of that plate 3 there is an optical filter F made up of red, green and blue color filter elements or stripes $F_R$, $F_G$ and $F_B$ arranged in a repeating cyclic order of $F_R, F_G, F_B, F_R, F_G, F_B, \cdots$. The color filter stripes are disposed parallel to the length of the stripes of electrode B in such a manner that each triad of red, green and blue color filter elements $F_R$, $F_G$ and $F_B$, is opposite to a pair of adjacent electrodes A and $B_i$. So long as the electrode B and the optical filter F are aligned with each other in their longitudinal directions, their relative lateral arrangement is not critical. The optical filter F is fixed on the inner surface of the face plate 4 which closes one end of the envelope 2E of tube 2. Thus, filter F, plate 3, electrodes A and B photoconductive layer 1 are enclosed in the tube envelope.

The color television camera is further shown to have an electron gun 11 in the tube envelope 2E for directing the electron beam against layer 1, and a deflection coil 6, focusing coil 7 and alignment coil 8 extending about the tube envelope to produce respective magnetic fields for acting on the electron beam. Further, in front of the face place 4 there is an image lens 9, by means of which the image of an object 0 to be televised is focused onto the photoconductive layer 1 through the faceplate 4.

Figure 4:
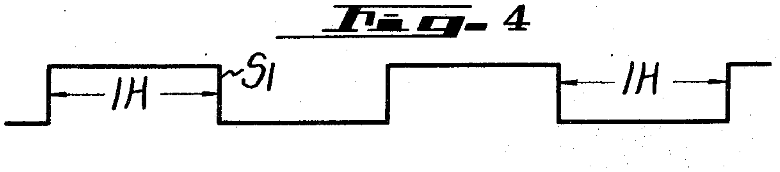
FIGS. 4 and 5A–5F are waveform diagrams to which reference will be made in explaining this invention.

Associated with the described tube 2 is a transformer 12 which consists of a primary winding 12*a* and a secondary winding 12*b* having a mid tap $t_o$ and end terminals $t_1$ and $t_2$ which are respectively connected to the terminals $T_A$ and $T_B$ of the image pickup tube 2. The primary winding 12*a* is connected to a signal source 13 which produces an alternating signal $S_1$ that is synchronized with the line scanning period of the image pickup tube 2. This alternating signal $S_1$ has a rectangular waveform, for example, as illustrated in FIG. 4, with a pulse width equal to a horizontal scanning period H of the electron beam, for instance, a pulse width of 63.5 microseconds and a frequency which is one half of the horizontal scanning frequency, that is, 15.75/2 KHz. The mid tap $t_o$ of the secondary winding 12*b* of the transformer 12 is connected to the input of a pre-amplifier 15 through a capacitor 14 and is suppoied with a DC bias voltage of 10 to 50V from a power source B+ through a resistor R.

Figure 6:
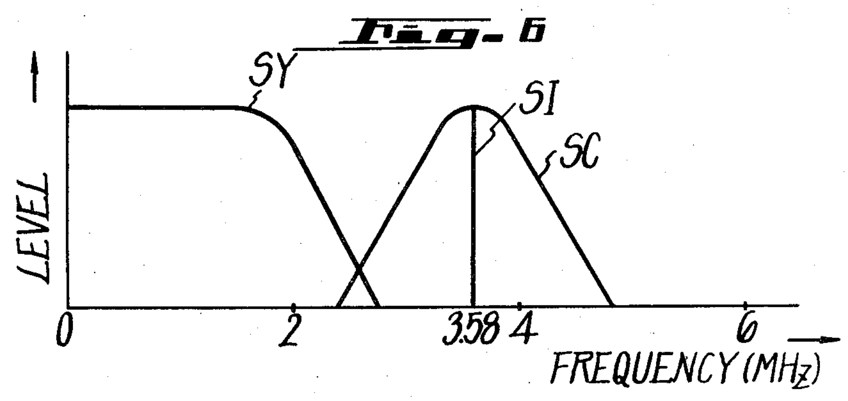
FIG. 6 is a frequency spectrum diagram for explaining this invention.
Figure 5A:
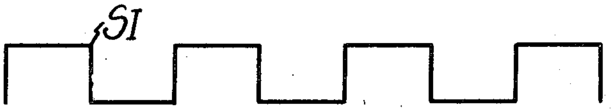
Figure 5B:
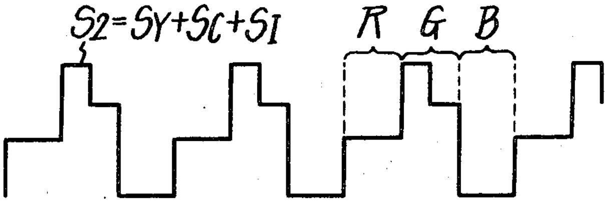

With such an arrangement, the electrodes A and B are alternately supplied with voltages that are higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, a signal corresponding to the rectangular waveform illustrated in FIG. 5A is derived at the mid tap $t_o$ due to electron beam scanning in a scanning period Hi. When a DC bias voltage, for example, of 30V, is supplied to the mid tap $t_o$ of the secondary winding 12*b* and an alternating voltage of 0.5V is impressed between the terminals $T_A$ and $T_B$, a current flowing across the resistor R varies by 0.05 microamperes and can be used as an index signal. The frequency of this index signal $S_I$ (FIG. 5A) may be determined with reference to the width and interval of the electrodes A and B and one horizontal scanning period of the electron beam, and, for example, may be 3.58MHz. When the image of the object 0 is focused on the photoconductive layer 1, signals corresponding to the light intensity of the filtered red, green and blue components are produced on the photoconductive layer 1 in overlapping relation with the index signal $S_I$ to produce a composite signal $S_2$, for example, as illustrated in FIG. 5B, in which the reference characters R, G and B respectively designate portions of the composite signal $S_2$ corresponding to the red, green and blue color components. The composite signal $S_2$ is the sum of the luminance signal $S_Y$, the chrominance signal $S_C$ and the index signal $S_I$, that is, $S_2=S_Y+S_C+S_I$. The frequency spectrum of the composite signal $S_2$, as illustrated in FIG. 6, is determined by the width of the electrodes A and B, the width of repeat of the optical filter F and the horizontal scanning period. Therefore, the composite signal $S_2$ is, in its entirety, in a bandwidth of 6 MHz and the luminance and chrominance signals $S_Y$ and $S_C$ are respectively arranged in the lower and higher bands. It is preferred to minimize overlapping of the luminance and chrominance signals $S_Y$ and $S_C$ and, if desired, for this purpose, a lenticular lens or the like may be disposed in front of the image pickup tube 2. This optically reduces resolution and narrows the luminance signal band.

In the next horizontal scanning period $H_{i+1}$, the voltage (alternating signal) applied to the electrodes A and B is reversed in phase, in which case an index signal $-S_I$ is produced, such as shown in FIG. 5A', which is opposite in phase to the index signal $S_I$ shown in FIG. 5A. Accordingly, a composite signal $S_2'$ is derived at the input side of the pre-amplifier 15, as shown in FIG. 5B', with $S_2'=S_Y+S_C-S_I$.

Figure 5C:
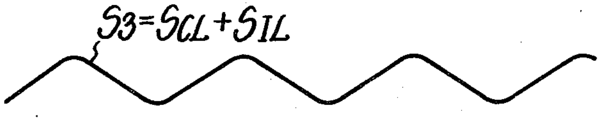
Figure 5A:
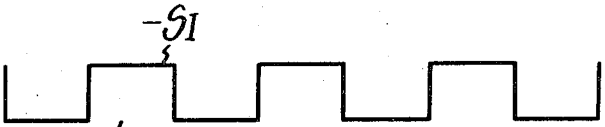
Figure 5B:
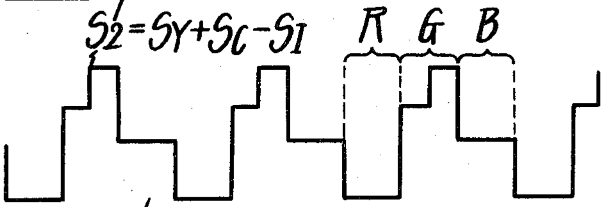
Figure 5C:

Such a composite signal $S_2$ (or $S_2'$) is first supplied to the pre-amplifier 15, to be amplified therein, and is then supplied to a process amplifier 16 for waveform shaping and/or gamma correction. Thereafter, the signal is applied to both a low-pass filter 17 and a bandpass filter 18. As a result, the luminance signal $S_Y$ and a signal $S_3=S_{CL}+S_{IL}$, such as is shown in FIG. 5C (or a signal $S_3'=S_{CL}-S_{IL}$, such as is shown in FIG. 5C') are separately derived from the low-pass filter 17 and the bandpass filter 18. $S_{CL}$ and $S_{IL}$ are low frequency components or fundamental components of the chrominance signal $S_L$ and the index signal $S_I$, respectively.

Since the repetitive frequencies of the index signals $S_I$ and the chrominance signal $S_C$ are equal to each other, the separation of these signals is achieved in the following manner without using a filter.

Figure 5D:

Reference numeral 19 indicates a delay circuit, such as, for example, an ultrasonic delay line, by means of which the signal $S_3=S_{CL}+S_{IL}$ (or $S_3'=S_{CL}-S_{IL}$) derived from the bandpass filter 18 is delayed by one horizontal scanning period 1H. The signals $S_3=S_{CL}+S_{IL}$ (or $S_3'=S_{CL}-S_{IL}$) in a certain horizontal scanning period $H_i$ and the signal $S_3'=S_{CL}-S_{IL}$ (or $S_3=S_{CL}+S_{IL}$) in the subsequent horizontal scanning period $H_{i+1}$, which are respectively derived from the delay circuit 19 and the bandpass filter 18, are supplied to an adder circuit 20 to be added together therein and to provide as an output a chrominance signal $2S_{CL}$, such as is depicted in FIG. 5D. When the delay in circuit 19 is one horizontal scanning period, the content of chrominance signals in adjacent horizontal scanning periods are so similar that they can be regarded as substantially the same. It is also possible to delay the signal from the bandpass filter 18 by three or five horizontal scanning periods due to the similarity of the chrominance signal contents in periods that are spaced even to that extent.

Figure 5E:
Figure 5F:

These signals $S_3=S_{CL}+S_{IL}$ (or $S_3'=S_{CL}-S_{IL}$) and $S_3'=S_{CL}-S_{IL}$ (or $S_3=S_{CL}\pm S_{IL}$) in the horizontal scanning periods $H_i$ and $H_{i+1}$ are also applied to a subtraction circuit 21 to achieve a subtraction $(S_{CL}'-S_{IL})-(S_{CL}+S_{IL})$ [or $(S_{CL}+S_{IL})-(S_{CL}-S_{IL})$] and to derive therefrom an index signal $-2S'_{IL}$,as depicted in FIG. 5E, (or $2S'_{IL}$, not shown). The resulting index signal $-2S'_{IL}$ (or $2S'_{IL}$) is fed to a limiter circuit 22 to render its amplitude uniform and thereby form an index signal $-2S_I$ (or $2S_I$), as depicted in FIG. 5F.

The index signal $-2S_I$ (or $2S_I$) thus obtained is reversed in phase at every horizontal scanning period, so that the signal $-2S_I$ is corrected in phase, in the following manner. Reference numeral 23 identifies a change-over switch which is preferably an electronic switch in practice. Such switch is shown to have fixed contacts 23*a* and 23*b* and a movable contact 23*c*. The output of the limiter 22 is directly connected to one fixed contact 23*a* of the change-over switch 23 and is connected to the other fixed contact 23*b* through an inverter 24. The change-over switch 23 is arranged so that its movable contact 23*c* makes contact with the fixed contacts 23*a* and 23*b* alternately in successive horizontal scanning periods in synchronism with the alternating signal $S_I$ impressed on the primary winding 12*a* of the transformer 12 to thereby derive the index signal $2S_I$ from the movable contact 23*c* at all times.

The chrominance signal $S_{CL}$ derived from the adder circuit 20 is supplied to each of three synchronous detectors 25,26 and 27. The index signal $S_{IL}$ is supplied to the synchronous detector 25 through a phase shifter 28 which adjusts the phase of the index signal to the axis of the red signal in order to produce a color difference signal R–Y at the output of the detector 25. In a similar manner the output signal from the phase shifter 28 is supplied to the synchronous detector 26 through a phase shifter 29 to produce a color difference signal G–Y at the output of the detector 26 and the output signal from the phase shifter 29 is supplied to the synchronous detector 27 through the phase shifter 30 to produce a color difference signal B–Y at the output of the detector 27. The phase shifters 29 and 30 each change the phase of the input signals by 120°. These color difference signals R–Y, G–Y and B–Y and the luminance signal $S_Y$ are applied to a matrix circuit 31 which provides color signals $S_R$, $S_G$ and $S_B$ at $T_R$, $T_G$ and $T_B$, respectively. The color signals thus obtained may be suitably processed to produce color television signals for the NTSC system and other various systems.

In the foregoing example, the color filter F is disposed within the image pickup tube 2 for the formation of the color separated images on the photoconductive layer 1, but it is also possible to project a color separated pattern of the object on the photoconductive layer by using a conventional optical system.

Figure 7A:
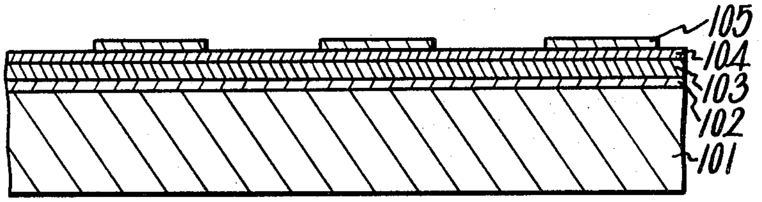
FIGS. 7A and 7B are enlarged, cross-sectional views illustrating steps involved in the manufacture of the principal portion of the image pickup tube.
Figure 7B:
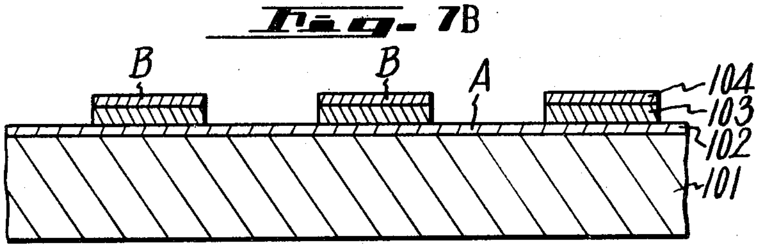

The electrodes A and B can be formed, for example by the steps depicted in FIGS. 7A and 7B. The first step is the formation, on one surface of an insulating plate 101, of a transparent conductive layer 102, for example, of tin oxide including antimony. Then, a transparent insulating layer 103, for example, of silicon dioxide, and a transparent conductive layer 104 similar to the layer 102 are sequentially formed over the entire area of the transparent conductive layer 102. After this, a photoresist material, such as KPR (trademark), is coated over the entire area of the layer 104 and exposed to light through a mask having a predetermined pattern, and thereafter the photoresist material is developed to provide an etching mask 105 having the predetermined pattern, as shown in FIG. 7A. Following this, unnecessary exposed portions of the transparent conductive layer 104 and the insulating layer 103 are etched away to provide the electrodes A and B by means of the exposed portions of layer 102 and the remaining portions of layer 104, as depicted in FIG. 7B. In this case, the etching operation may be achieved with two steps, that is, the overall structure may be immersed in one etchant for selectively etching away the conductive layer 104 and then in another etchant for selectively etching away the insulating layer 103. However, since the thickness of the conductive layer 104 is far smaller than the width of the portion to be removed, the conductive layer 104 and the insulating layer 103 to be etched away can be removed simultaneously by selectively etching away the insulating layer 103 of silicon dioxide through the conductive layer 104 using an etchant composed of, for example, a mixture of fluoric acid with antimony fluoride. The latter method requires only one etching process.

With the arrangement according to the present invention as above described, the respective color signals can be picked up without crosstalk therebetween and the index signal for color separation can also be obtained with ease to ensure separation of the respective color signals. Further, the index signal is not produced optically as previously described, and this leads to simplification of the optical system used and an increase in the rate of utilization of light to provide an increased dynamic range of the photoconductive layer.

Since the two sets of stripe electrodes for producing the index signal are provided by forming the stripe electrode B on the first electrode A with the insulating layer 5 therebetween, the photoconductive layer 1 makes contact with either of the electrodes A and B over the entire area of the photoconductive layer. Accordingly, photoelectric conversion is achieved all over the photoconductive layer to provide for uniform photoelectric conversion efficiency over the entire area thereof. This eliminates the possibility that the absence of the electrode at one portion of the photoconductive layer may lead to loss of the signal component corresponding to the color at that portion with consequently reduced color fidelity. Therefore, complete white balance is always obtained and the signal to noise ratio is enhanced. In addition, when the electrodes A and B are formed of the same material, the condition of the boundary between the electrodes A and B and the photoconductive layer 1 is uniform throughout. Further, the electrodes can be readily formed by etching as previously described and the portions to be etched away are relatively wide and hence can be accurately etched away with ease in the making thereof.

In the foregoing example, the stripe electrode B and the insulating layer 5 are coupled together at both ends as a unitary structure, as shown on FIG. 3, so as to ensure mechanical and electrical connection of the electrode B even when one or more of the stripe electrodes $B_i$ is cracked by some cause in the manufacturing process. When there is no fear of such cracking of the electrode B, it is possible to couple together the stripe electrodes $B_i$ only at one end, in a so-called comb-like form.

Although a specific embodiment of the invention has been described in detail herein with reference to the accompanying drawings, it is to be understood that the invention is not limited to that embodiment, and that changes and modifications may be effected therein by one skilled in the art without departing from the scope or spirit of the invention.

What is claimed is:

1. A color television camera comprising image pickup means having a first continuous transparent conductive layer, a plurality of insulator layers formed on spaced apart, stripe-like areas of said first conductive layer, a plurality of second transparent conductive layers which are stripe-like and formed on said insulating layers to be separated by the latter from said first transparent conductive layer and a photoconductive layer formed over said first and second conductive layers and contacting all of said second conductive layers and said first conductive layer between said insulator layers, filter means disposed between an object to be televised and said photoconductive layer to form a first color video image on said photoconductive layer in accordance with the color components of said object, and circuit means for supplying voltages to said first and second conductive layers to form electrically on said photoconductive layer a second index image which is in overlapping relation to said first image to indicate the relationship between said color components of said object.

2. A color television camera as in claim 1, wherein the width of each second conductive layer is equal to the width of the respective insulator layer.

3. A color television camera as in claim 1, wherein said image pickup means is a vidicon tube and has means for generating an electron beam.

4. A color television camera as in claim 3, in which said tube further includes means for deflecting the electron beam in vertical and horizontal directions for scanning of said photoconductive layer, and in which the longitudinal direction of each of said second conductive layers crosses said horizontal direction of beam deflection.

5. A color television camera as in claim 4, wherein said circuit means alternately supplies high voltage to said first and second conductive layers at every horizontal scanning.

6. A color picture pickup tube for a color television camera comprising electron beam generating means, a transparent plate, a first continuous transparent conductive layer on said transparent plate, a plurality of spaced apart, stripe-like insulator layers on said first transparent conductive layer, a plurality of stripe-like second transparent conductive layers on said insulator layers to be electrically separated by the latter from said first conductive layer, means for electrically connecting said second transparent conductive layers to each other, a photoconductive layer formed on said second transparent conductive layers and on the areas of said first conductive layer between said insulator layers, and connecting means for said first and second transparent conductive layers, respectively.

7. A color picture pickup tube as in claim 6, further comprising color filter adjacent said photoconductive layer.

8. A color picture pickup tube as in claim 7, wherein said color filter includes stripe-like filter elements having their longitudinal directions parallel with that of said stripe-like second conductive layers.

9. A color picture pickup tube as in claim 6, wherein the width of each of said insulator layers is equal to that of the respective second conductive layer.

* * * * *